United States Patent
Sun et al.

(10) Patent No.: US 10,261,617 B2
(45) Date of Patent: Apr. 16, 2019

(54) IN-CELL TOUCH PANEL AND DISPLAY DEVICE

(71) Applicants: BOE TECHNOLOGY GROUP CO., LTD., Beijing (CN); ORDOS YUANSHENG OPTOELECTRONICS CO., LTD., Ordos, Inner Mongolia (CN)

(72) Inventors: Jian Sun, Beijing (CN); Xueguang Hao, Beijing (CN); Xuelu Wang, Beijing (CN); Cheng Li, Beijing (CN)

(73) Assignees: BOE TECHNOLOGY GROUP CO., LTD., Beijing (CN); ORDOS YUANSHENG OPTOELECTRONICS CO., LTD., Ordos, Inner Mongolia (CN)

( * ) Notice: Subject to any disclaimer, the term of this patent is extended or adjusted under 35 U.S.C. 154(b) by 537 days.

(21) Appl. No.: 14/368,642

(22) PCT Filed: Dec. 3, 2013

(86) PCT No.: PCT/CN2013/088466
§ 371 (c)(1),
(2) Date: Jun. 25, 2014

(87) PCT Pub. No.: WO2015/039382
PCT Pub. Date: Mar. 26, 2015

(65) Prior Publication Data
US 2016/0283009 A1 Sep. 29, 2016

(30) Foreign Application Priority Data
Sep. 23, 2013 (CN) .......................... 2013 1 0444509

(51) Int. Cl.
*G06F 3/041* (2006.01)
*G06F 3/044* (2006.01)
*G02F 1/1333* (2006.01)
*G02F 1/1335* (2006.01)
(Continued)

(52) U.S. Cl.
CPC .......... *G06F 3/0416* (2013.01); *G02F 1/1368* (2013.01); *G02F 1/13338* (2013.01);
(Continued)

(58) Field of Classification Search
CPC ... G06F 3/0488; G06F 3/04883; G06F 3/0416
See application file for complete search history.

(56) References Cited

U.S. PATENT DOCUMENTS 9,348,460 B2 * 5/2016 Lee ........................ G06F 3/0418
9,372,564 B2 * 6/2016 Wang ...................... G06F 3/041
(Continued)

FOREIGN PATENT DOCUMENTS

CN 101685360 A 3/2010
CN 102109690 A 6/2011
(Continued)

OTHER PUBLICATIONS

International Preliminary Report on Patentability Appln. No. PCT/CN2013/088466; dated Mar. 29, 2016.
(Continued)

*Primary Examiner* — Alexander Eisen
*Assistant Examiner* — Mansour Said
(74) *Attorney, Agent, or Firm* — Ladas & Parry LLP (57) ABSTRACT

The disclosure discloses an in-cell touch panel and a display device, wherein a touch sensing structural layer for implementing a touch control function is added between an upper substrate and a lower substrate, the touch sensing structural layer includes first touch sensing electrodes and second touch sensing electrodes both provided in a same layer, insulated from each other and arranged crosswise, wherein an orthographic projection on the lower substrate, of a graph of the added touch sensing structural layer is located in a
(Continued)

region where a graph of the black matrix layer is located, capable of avoiding occupying an aperture rate of pixel units.

10 Claims, 4 Drawing Sheets

(51) Int. Cl.
*G02F 1/1343* (2006.01)
*G02F 1/1362* (2006.01)
*G02F 1/1368* (2006.01)
*G09G 3/36* (2006.01)

(52) U.S. Cl.
CPC .... *G02F 1/13439* (2013.01); *G02F 1/133512* (2013.01); *G02F 1/134309* (2013.01); *G02F 1/136286* (2013.01); *G06F 3/044* (2013.01); *G06F 3/0412* (2013.01); *G09G 3/3677* (2013.01); *G09G 3/3688* (2013.01); *G09G 3/3696* (2013.01); *G02F 2201/40* (2013.01); *G06F 2203/04103* (2013.01); *G06F 2203/04111* (2013.01); *G09G 2300/0809* (2013.01); *G09G 2300/0842* (2013.01); *G09G 2310/0202* (2013.01); *G09G 2310/0278* (2013.01)

(56) References Cited

U.S. PATENT DOCUMENTS

| | | | | |
|---|---|---|---|---|
| 2011/0050617 | A1* | 3/2011 | Murphy | G06F 3/0418 345/174 |
| 2011/0157039 | A1* | 6/2011 | Shin | G02F 1/13338 345/173 |
| 2012/0218482 | A1* | 8/2012 | Hwang | G06F 3/044 349/12 |
| 2012/0274603 | A1* | 11/2012 | Kim | G06F 3/0412 345/174 |
| 2013/0147730 | A1* | 6/2013 | Chien | G06F 3/0412 345/173 |
| 2014/0062920 | A1* | 3/2014 | Lee | G06F 3/041 345/173 |
| 2014/0118283 | A1 | 5/2014 | Wang et al. | |
| 2014/0118299 | A1 | 5/2014 | Wang et al. | |
| 2015/0049050 | A1 | 2/2015 | Zhao | |

FOREIGN PATENT DOCUMENTS

| | | |
|---|---|---|
| CN | 102929031 A | 2/2013 |
| CN | 103197796 A | 7/2013 |
| CN | 103294273 A | 9/2013 |

OTHER PUBLICATIONS

Second Chinese Office Action Appln. No. 201310444509.0; dated Apr. 6, 2016.

First Chinese Office Action Appln. No. 201310444509.0; dated Oct. 26, 2015.

International Search Report Appln. No. PCT/CN2013/088466; dated Jun. 5, 2014.

Third Chinese Office Action dated Aug. 30, 2016; Appln. No. 201310444509.0.

* cited by examiner

IN-CELL TOUCH PANEL AND DISPLAY DEVICE

TECHNICAL FIELD

The present disclosure relates to the display technical field, particularly to an in-cell touch panel and a display device.

BACKGROUND

An in-cell touch panel is a touch display panel integrating a touch panel and a display panel. That is, touch driving electrodes and touch sensitive electrodes are integrated in the display panel and the in-cell touch panel can implement functions of touch control and image display. Since the in-cell touch panel has advantages of a simple structure, being light, being thin, a low cost and etc., it has gradually become a mainstream of the display technical field.

Figure 1:
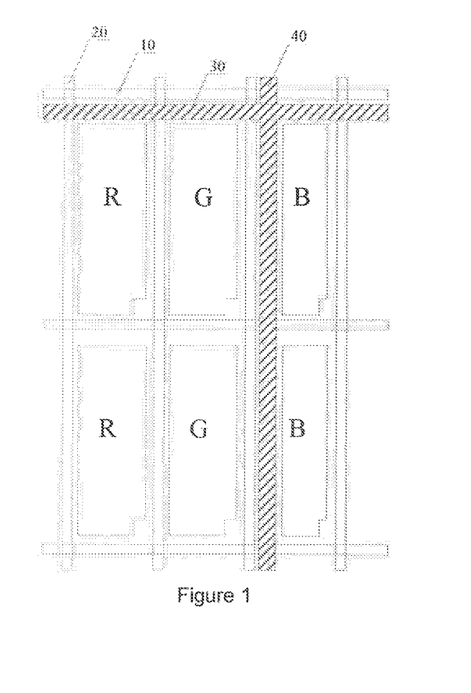
FIG. 1 is a structural schematic diagram of an existing in-cell touch panel.

In the in-cell touch technique, common touch driving electrodes and touch sensitive electrodes are such that electrodes in parallel to gate scanning lines and electrodes in parallel to data signal lines are added in a region corresponding to a black matrix on an array substrate. FIG. 1 is a structural schematic diagram of an existing in-cell touch panel. Specifically, FIG. 1 shows an existing in-cell touch panel comprising: a plurality of gate scanning lines 10 distributed laterally; a plurality of data signal lines 20 distributed longitudinally; and sub-pixel units formed by arranging the gate scanning lines 10 and the data signal lines 20 around, such as red sub-pixel units (R), green sub-pixel units (G) and blue sub-pixel units (B) shown in FIG. 1, the plurality of sub-pixel units being arranged in a matrix; touch driving electrodes 30 in parallel to the gate scanning lines 10, located between two adjacent sub-pixel units; and touch sensitive electrodes 40 in parallel to the data signal lines 20, located between two adjacent sub-pixel units.

Since the touch driving electrodes 30 and the touch sensitive electrodes 40 are formed by being manufactured together with the gate scanning lines 10 and the data signal lines 20 by using a same process, the touch driving electrodes 30 and the touch sensitive electrodes 40 are opaque electrodes and are located in non-display regions between adjacent sub-pixel units.

In the in-cell touch panel shown in FIG. 1, since the gate scanning lines and the touch driving electrodes need to keep a certain distance from each other to ensure mutual insulation, and the data signal lines and the touch sensitive electrodes need to keep a certain distance from each other to ensure mutual insulation, the aperture rate of the sub-pixel units is low.

SUMMARY

The embodiment of the present disclosure provides an in-cell touch panel and a display device for increasing the aperture rate of the in-cell touch panel.

An in-cell touch panel provided by the embodiment of the present disclosure comprises an upper substrate and a lower substrate arranged opposite to each other, and further comprises a black matrix layer and a touch sensing structural layer arranged between the upper substrate and the lower substrate; an orthographic projection on the lower substrate, of a graph of the touch sensing structural layer is located in a region where a graph of the black matrix layer is located; and the touch sensing structural layer comprises first touch sensing electrodes and second touch sensing electrodes both provided in a same layer, insulated from each other and arranged crosswise, wherein in a touch control period, a touch control scanning signal is applied to the first touch sensing electrodes, and the second touch sensing electrodes couple with the touch control scanning signal and provide an output; or, a touch control scanning signal is applied to the second touch sensing electrodes, and the first touch sensing electrodes couple with the touch control scanning signal and provide an output.

The above mentioned in-cell touch panel provided by the embodiment of the present disclosure adds a touch sensing structural layer for implementing a touch control function between the upper substrate and the lower substrate, the touch sensing structural layer comprising first touch sensing electrodes and second touch sensing electrodes both provided in a same layer, insulated from each other and arranged crosswise, wherein the orthographic projection on the lower substrate, of the graph of the added touch sensing structural layer is located in the region where the graph of the black matrix layer is located, capable of avoiding occupying an aperture rate of the pixel units.

Optionally, in the above mentioned in-cell touch panel provided by the embodiment of the present disclosure, the black matrix layer is located on one side of the upper substrate facing the lower substrate, and a colored resin layer is further provided on the black matrix layer; and the touch sensing structural layer is located between the upper substrate and the black matrix layer or is located between the black matrix layer and the colored resin layer or is located on the colored resin layer.

Optionally, in the above mentioned in-cell touch panel provided by the embodiment of the present disclosure, the first touch sensing electrode is composed of a plurality of first touch sensing sub-electrodes independent of each other where the first touch sensing sub-electrodes are arrange by spacing apart from the second touch sensing electrodes; and the first touch sensing sub-electrodes belonging to a same first touch sensing electrode and located on two sides of the second touch sensing electrode are electrically connected through a first bridging connection line; or the second touch sensing electrode is composed of a plurality of second touch sensing sub-electrodes independent of each other where the second touch sensing sub-electrodes are arrange by spacing apart from the first touch sensing electrodes; and the second touch sensing sub-electrodes belonging to a same second touch sensing electrode and located on two sides of the first touch sensing electrode are electrically connected through a second bridging connection line.

Specifically, in order to avoid influencing the displayed aperture rate, in the above mentioned touch panel provided by the embodiment of the present disclosure, the orthographic projection on the lower substrate, of the first and second bridging connection lines is located in the region where the graph of the black matrix layer is located.

Further, in the above mentioned in-cell touch panel provided by the embodiment of the present disclosure, in order to prevent signal interferences from being generated between the first touch sensing electrodes, a first floating electrode is provided between two adjacent first touch sensing electrodes; and/or, in order to prevent signal interferences from being generated between the first touch sensing electrodes, a second floating electrode is provided between two adjacent second touch sensing electrodes.

Specifically, in order to avoid influencing the displayed aperture rate, in the above mentioned touch panel provided by the embodiment of the present disclosure, the orthographic projection on the lower substrate, of the first floating electrode is located in the region where the graph of the black matrix layer is located; and, the orthographic projection on the lower substrate, of the second floating electrode is located in the region where the graph of the black matrix layer is located.

Specifically, in the above mentioned in-cell touch panel provided by the embodiment of the present disclosure, the material of the first touch sensing electrode and second touch sensing electrode is a metal material or a transparent conductive oxide material.

The embodiment of the present disclosure further provides a display device comprising the above mentioned in-cell touch panel provided by the embodiment of the present disclosure.

DETAILED DESCRIPTION

The embodiment of the present disclosure provides an in-cell touch panel and a display device, for increasing an aperture rate of the in-cell touch panel.

First, the operation principle of the in-cell touch panel will be introduced briefly.

A capacitor formed between the electrode arrays arranged crosswise is of a projected capacitive type and is also called a coupling capacitor. When a finger touches the touch panel, the finger changes the coupling capacitance between adjacent electrodes, and the position of the touch point is determined by detecting changes in the value of the coupling capacitor of the touch point.

The in-cell touch panel provided by the embodiment of the present disclosure adds a touch sensing structural layer for implementing a touch control function between an upper substrate and a lower substrate, the touch sensing structural layer comprises first touch sensing electrodes and second touch sensing electrodes both provided in a same layer, insulated from each other and arranged crosswise, wherein the orthographic projection on the lower substrate, of the graph of the added touch sensing structural layer is located in the region where the graph of the black matrix layer is located, capable of avoiding occupying an aperture rate of pixel units, and the first touch sensing electrodes and the second touch sensing electrodes are provided in a same layer, capable of reducing the thickness of the touch panel.

Figure 2:
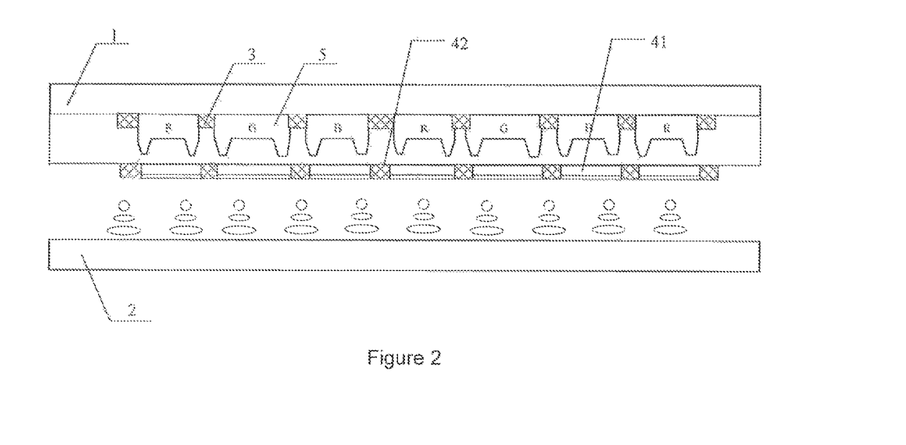
FIG. 2 is a schematic side view of the in-cell touch panel provided by the embodiment of the present disclosure.

FIG. 2 is a schematic side view of the in-cell touch panel provided by the embodiment of the present disclosure. As shown in FIG. 2, the in-cell touch panel comprises an upper substrate 1 and a lower substrate 2 arranged opposite to each other, and further comprises a black matrix layer 3 and a touch sensing structural layer 4 arranged between the upper substrate 1 and the lower substrate 2.

An orthographic projection on the lower substrate 2, of a graph of the touch sensing structural layer 4 is located in a region where a graph of the black matrix layer 3 is located.

Figure 3A:
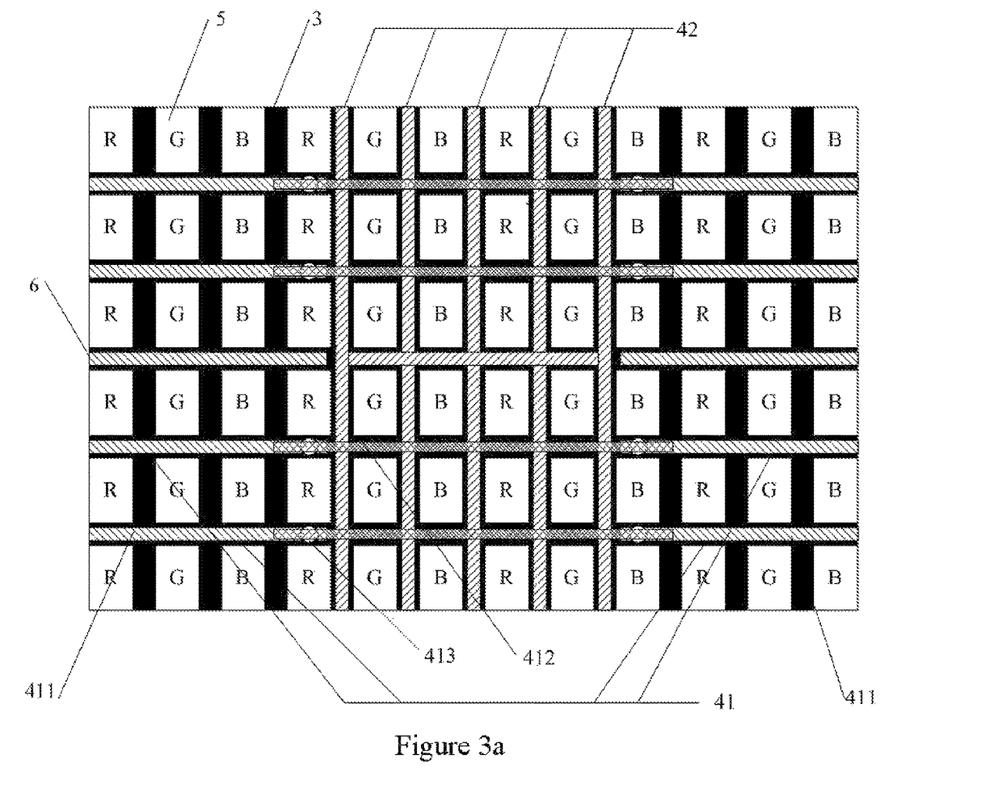
FIG. 3a and FIG. 3b are schematic top view of the in-cell touch panel provided by the embodiment of the present disclosure.
Figure 3B:
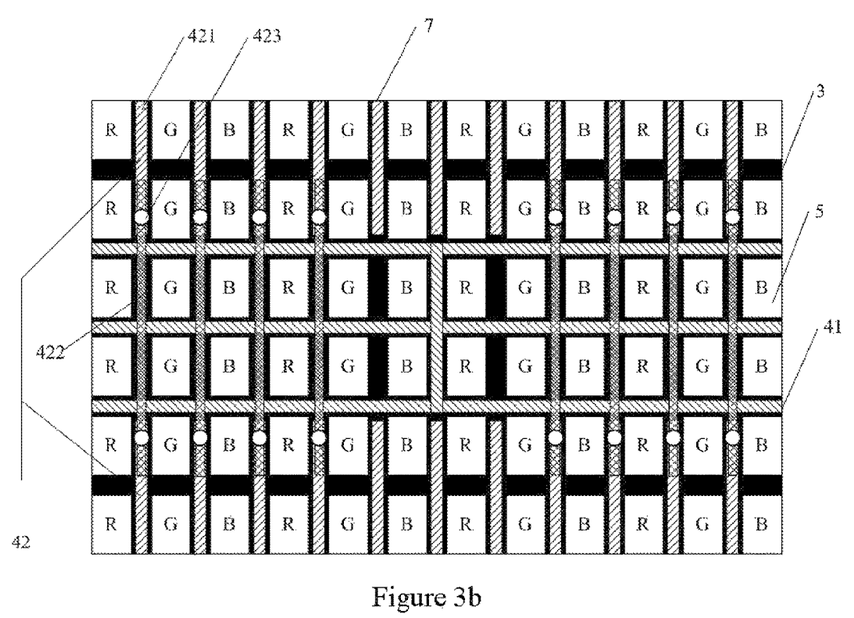

FIG. 3a and FIG. 3b are schematic top view of the in-cell touch panel provided by the embodiment of the present disclosure. The touch sensing structural layer 4, as shown in FIG. 3a and FIG. 3b, specifically comprises first touch sensing electrodes 41 and second touch sensing electrodes 42 both provided in a same layer, insulated from each other and arranged crosswise. Wherein in a touch control period, a touch control scanning signal is applied to the first touch sensing electrodes 41, and the second touch sensing electrodes 42 couple with the touch control scanning signal and provide an output; or, a touch control scanning signal is applied to the second touch sensing electrodes 42, and the first touch sensing electrodes 41 couple with the touch control scanning signal and provide an output.

When being implemented specifically, the first touch sensing electrodes 41 may be touch sensitive electrodes (Rx, receive), and the second touch sensing electrodes 42 are touch driving electrodes (Tx, Transport) correspondingly; on the contrary, the first touch sensing electrodes 41 may also be touch driving electrodes Tx, the second touch sensing electrodes 42 are touch sensitive electrodes Rx correspondingly, which is not defined herein. And, when being implemented specifically, since being blocked by the graph of the black matrix layer 3, the first touch sensing electrodes 41 and the second touch sensing electrodes 42 can be manufactured by adopting a transparent conductive oxide material such as Indium tin oxide (ITO), and can also be manufactured by adopting a metal material such as Al and Mo, which will not be repeated herein.

Specifically, in the above mentioned in-cell touch panel provided by the embodiment of the present disclosure, as shown in FIG. 2, a structure that the colored resin layers 5 (R, G, B resin layers as shown in FIG. 2) and the black matrix layers 3 are provided on the upper substrate 1 opposite to the lower substrate 2, i.e. a colored film substrate, can be applied, the colored resin layers 5 are separated from each other through the graphs of the black matrix layers 3. Of course, a structure that the colored resin layers and the black matrix layers are provided on the lower substrate can also be applied, which will not be defined herein. In the following, the touch panel provided by the embodiment of the present disclosure is all described by taking the structure that the upper substrate 1 is the colored film substrate as an example.

Specifically, the black matrix layer 3 is arranged on one side of the upper substrate 1 facing the lower substrate 2, and the colored resin layer 5 is provided on the black matrix layer 3; and when being implemented specifically, the touch sensing structural layer 4 can be provided on one side of the upper substrate 1 facing the lower substrate 2, and specifically, the touch sensing structural layer 4 can be located between the upper substrate 1 and the black matrix layer 3, or can also be located between the black matrix layer 3 and the colored resin layer 5, or can also be on the colored resin layer 5 as shown in FIG. 2. In addition, the touch sensing structural layer 4 can also be provided on one side of the lower substrate 2 facing the upper substrate 1, which is not defined herein.

Specifically, in order to ensure the first touch sensing electrodes 41 and the second touch sensing electrodes 42 in the touch sensing structural layer 4 to be arranged crosswise, when being implemented specifically, the first touch sensing electrodes 41 can be arranged to extend laterally, the second touch sensing electrodes 42 can be arranged to extend longitudinally and vice versa. The following are all described by taking that the first touch sensing electrodes 41 extends laterally and the second touch sensing electrodes 42 extends longitudinally, as an example.

When being implemented specifically, in order to ensure the first touch sensing electrodes 41 and the second touch sensing electrodes 42 in the touch sensing structural layer 4 are arrange in a same layer and insulate from each other, as shown in FIG. 3a, the first touch sensing electrodes 41 can be composed of a plurality of first touch sensing sub-electrodes 411 independent from each other, and the first touch sensing sub-electrodes 411 are arranged by spacing apart from the second touch sensing electrodes 42; and, the first touch sensing sub-electrodes 411 belonging to a same first touch sensing electrode 41 and located on the two sides of the second touch sensing electrode 42 are connected electrically through a first bridging connection line 412. Moreover, because the first bridging connection line 412 and the first touch sensing sub-electrodes 411 are located in different layers and can be connected through a via hole 413, and the first bridging connection line 412 and the second touch sensing electrodes 42 insulate from each other.

Or, in another example, as shown in 3b, the second touch sensing electrodes 42 can be composed of a plurality of second touch sensing sub-electrodes 421 independent from each other, and the second touch sensing sub-electrodes 421 are arranged by spacing apart from the first touch sensing electrodes 41; and, the second touch sensing sub-electrodes 421 belonging to a same second touch sensing electrodes 42 and located on the two sides of the first touch sensing electrode 41 are connected electrically through a second bridging connection line 422. Moreover, because the second bridging connection line 422 and the second touch sensing sub-electrodes 412 are located in different layers and can be connected through a via hole 423, and the second bridging connection line 422 and the first touch sensing electrodes 41 insulate from each other.

In the above mentioned two examples, in order to ensure the first bridging connection line 412 connecting the first touch sensing sub-electrodes 411 and the second bridging connection line 422 connecting the second touch sensing sub-electrodes 421 do not occupy the aperture rate, generally, the first and second bridging connection lines 412 and 422 are provided to coincide with the graph of the black matrix layer, i.e., the orthographic projections on the lower substrate 2, of the first and second bridging connection lines 412 and 422 are located in the region where the graph of the black matrix layer 3 is located.

It needs to be indicated that, the bridging connection lines and the first touch sensing electrodes and the second touch sensing electrodes provided by the embodiment of the present disclosure are in different layers, so the bridging connection lines can be arranged between two adjacent layers of film layers having an insulation effect. In addition, the bridging connection lines can also be arranged in a same layer as the black matrix layer, which will not be defined herein.

Further, in the above mentioned in-cell touch panel provided by the embodiment of the present disclosure, in order to prevent signal interferences from being generated among the first touch sensing electrodes 41, as shown in FIG. 3a, there can be further provided a first floating electrode 6 between two adjacent first touch sensing electrodes 41. In a touch control period, the first floating electrode 6 is grounded.

Similarly, in order to prevent signal interferences from being generated among the second touch sensing electrodes 42, as shown in FIG. 3b, there can be further provided a second floating electrode 7 between two adjacent second touch sensing electrodes 42. In the touch control period, the second floating electrode 7 is grounded.

And, in order to ensure the added first floating electrode 6 and second floating electrode 7 do not occupy the aperture rate, preferably, the first floating electrode 6 and the second floating electrode 7 are arranged to coincide with the graph of the black matrix layer, i.e., as shown in FIG. 3a, the orthographic projection on the lower substrate 2, of the first floating electrode 6 is located in the region where the graph of the black matrix layer 3 is located; and the orthographic projection on the lower substrate 2, of the second floating electrode 7 is located in the region where the graph of the black matrix layer 3 is located.

Figure 4:
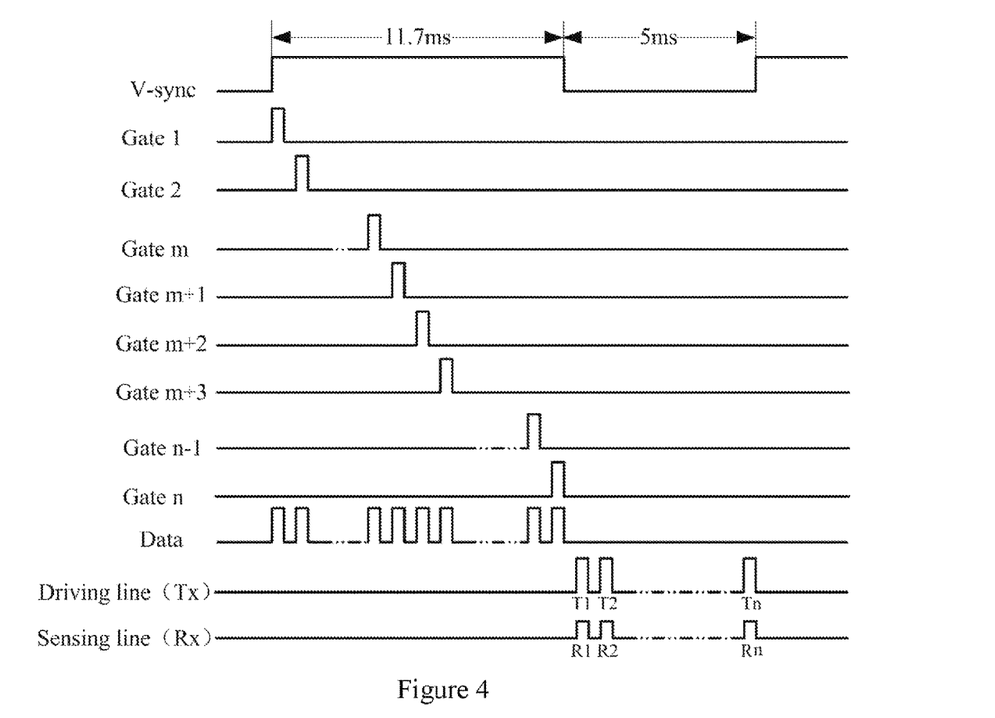
FIG. 4 is a timing chart showing that the in-cell touch panel provided by the embodiment of the present disclosure implements a touch control function.

FIG. 4 is a timing chart showing that the in-cell touch panel provided by the embodiment of the present disclosure implements a touch control function. FIG. 4, is the timing chart of an image display and touch function, specifically describes the operation principle of the in-cell touch panel provided by the embodiment of the present disclosure.

In FIG. 4, V-sync is a timing signal. There are comprised n gate lines, which are, respectively, gate line 1 (Gate 1), gate line 2 (Gate 2), . . . , gate line m (Gate m), gate line m+1 (Gate m+1), gate line m+2 (Gate m+2), gate line m+3 (Gate m+3), gate line n−1 (Gate n−1) and gate line n (Gate n). There is also comprised a data line Date. There are comprised the timing of n touch driving electrodes (T1, T2, . . . , Tn) and the timing of n touch sensing electrodes (R1, R2, . . . , Rn).

Assuming the time for displaying a frame of image is 16.7 ms, as shown in FIG. 4, the former 11.7 ms is a display period, and last 5 ms is a touch control period; in the specific implementation period, within the former 11.7 ms is sequentially that a gate line is applied a gate voltage, while sequentially a data line is applied a data signal, to implement image display. Within the last 5 ms is that the data line is applied a low level signal such that a TFT connected with the gate line is turned off. Sequentially, a touch driving electrode Tx is applied a certain touch drive voltage V1, while a touch sensing electrode Rx is applied a constant voltage or an alternative voltage V0. The touch sensing electrode being applied voltage V0 and the touch driving electrode being applied voltage V1 have capacitance generated therebetween, to implement a touch function.

The above mentioned 11.7 ms of the display period and 5 ms of the touch control period are only an example shown by the embodiment of the present disclosure, and in the specific implementation process, the display period is not limited to 11.7 ms and the touch control period is not limited to 5 ms.

It needs to be indicated that, the in-cell touch panel provided by the embodiment of the present disclosure can be integrated in an LCD panel of TN pattern or an LCD panel of ADS (Advanced Super Dimension Switch) pattern. The ADS pattern is a plane electric field wide viewing angle core technology, the characteristics of which are described as: a multi-dimensional electric field is formed through an electric field generated by a slit electrode edge on a same plane and an electric field generated between a slit electrode layer and a plane shaped electrode layer, such that liquid crystal molecules of all orientations right above the slit electrodes between the electrodes in an liquid crystal box can generate rotation, thus enhancing liquid crystal efficiency and increasing light transmission efficiency. The switch technique of the ADS pattern can enhance the picture quality of the TFT-LCD product and has such advantages as high resolution, high transmittance, low power consumption, wide viewing angle, high aperture ratio, low color, no push Mura, etc. With respect to different applications, the improved technique of the ADS techniques are a high transmittance I-ADS technique, a high aperture ratio H-ADS and a high resolution S-ADS technique, etc.

Based on a same inventive concept, the embodiment of the present disclosure further provides a display device, comprising the above mentioned in-cell touch panel provided by the embodiment of the present disclosure, and the display device can be any product or component having a display function such as mobile phones, tablet computers, televisions, display, notebook computers, digital picture frames, navigation systems, etc. Refer to embodiment of the above mentioned in-cell touch panel for the implementation of the display device, and the repetitive parts will not be described again herein.

The above mentioned in-cell touch panel and display device provided by the embodiment of the present disclosure add a touch sensing structural layer for implementing a touch control function between an upper substrate and a lower substrate, the touch sensing structural layer comprises first touch sensing electrodes and second touch sensing electrodes both provided in a same layer, insulated from each other and arranged crosswise. An orthographic projection on the lower substrate, of a graph of the added touch sensing structural layer is located in a region where a graph of the black matrix layer is located, capable of avoiding occupying an aperture rate of pixel units.

Obviously, those skilled in the art may make various changes and variations to the present invention without departing from the spirit and scope of the present invention. Thus, if the changes and variations for the present invention belong to the scope of the claims and the equivalents thereof of the present invention, then the present invention is also intended to cover the changes and variations.

The invention claimed is:

1. An in-cell touch panel comprising an upper substrate and a lower substrate arranged opposite to each other, further comprising a black matrix layer and a touch sensing structural layer between the upper substrate and the lower substrate; wherein
   a projection on the lower substrate, of a pattern of the touch sensing structural layer is located in a region where a projection on the lower substrate, of a pattern of the black matrix layer is located; and
   the touch sensing structural layer includes first touch sensing electrodes and second touch sensing electrodes both provided in a same layer, insulated from each other and arranged crosswise, wherein in a touch control period, a touch control scanning signal is applied to the first touch sensing electrodes, and the second touch sensing electrodes couple with the touch control scanning signal and provide an output; or, a touch control scanning signal is applied to the second touch sensing electrodes, and the first touch sensing electrodes couple with the touch control scanning signal and provide an output,
   wherein the first touch sensing electrodes and the second touch sensing electrodes which both are provided in the same layer are blocked by the pattern of the black matrix layer,
   wherein a first floating electrode is provided between two adjacent first touch sensing electrodes; and/or, a second floating electrode is provided between two adjacent second touch sensing electrodes,
   wherein the projection on the lower substrate, of the first floating electrode is located in the region where the projection on the lower substrate, of the pattern of the black matrix layer is located; and, the projection on the lower substrate, of the second floating electrode is located in the region where the projection on the lower substrate, of the pattern of the black matrix layer is located.

2. The touch panel of claim 1, wherein the black matrix layer is located on one side of the upper substrate facing the lower substrate, and a colored resin layer is further provided on the black matrix layer; and
   the touch sensing structural layer is located between the upper substrate and the black matrix layer or is located between the black matrix layer and the colored resin layer or is located on the colored resin layer.

3. The touch panel of claim 1, wherein the first touch sensing electrode is composed of a plurality of first touch sensing sub-electrodes independent of each other where the first touch sensing sub-electrodes are arrange by spacing apart from the second touch sensing electrodes; and the first touch sensing sub-electrodes belonging to a same first touch sensing electrode and located on two sides of the second touch sensing electrode are electrically connected through a first bridging connection line; or
   the second touch sensing electrode is composed of a plurality of second touch sensing sub-electrodes independent of each other where the second touch sensing sub-electrodes are arrange by spacing apart from the first touch sensing electrodes; and the second touch sensing sub-electrodes belonging to a same second touch sensing electrode and located on two sides of the first touch sensing electrode are electrically connected through a second bridging connection line.

4. The touch panel of claim 3, wherein the projection on the lower substrate, of the first and second bridging connection lines is located in the region where the projection on the lower substrate, of the pattern of the black matrix layer is located.

5. The touch panel of claim 1, wherein the material of the first touch sensing electrode and second touch sensing electrode is a metal material or a transparent conductive oxide material.

6. A display device comprising an in-cell touch panel, the in-cell touch panel comprising an upper substrate and a lower substrate arranged opposite to each other, further comprising a black matrix layer and a touch sensing structural layer between the upper substrate and the lower substrate; wherein
   a projection on the lower substrate, of a pattern of the touch sensing structural layer is located in a region where a projection on the lower substrate, of a pattern of the black matrix layer is located; and
   the touch sensing structural layer includes first touch sensing electrodes and second touch sensing electrodes both provided in a same layer, insulated from each other and arranged crosswise, wherein in a touch control period, a touch control scanning signal is applied to the first touch sensing electrodes, and the second touch sensing electrodes couple with the touch control scanning signal and provide an output; or, a touch control scanning signal is applied to the second touch sensing electrodes, and the first touch sensing electrodes couple with the touch control scanning signal and provide an output,
   wherein the first touch sensing electrodes and the second touch sensing electrodes which both are provided in the same layer are blocked by the pattern of the black matrix layer, wherein a first floating electrode is provided between two adjacent first touch sensing electrodes; and/or, a second floating electrode is provided between two adjacent second touch sensing electrodes, wherein the projection on the lower substrate, of the first floating electrode is located in the region where the projection on the lower substrate, of the pattern of the black matrix layer is located; and, the projection on the lower substrate, of the second floating electrode is located in the region where the projection on the lower substrate, of the patter of the black matrix layer is located.

7. The display device of claim 6, wherein the black matrix layer is located on one side of the upper substrate facing the lower substrate, and a colored resin layer is further provided on the black matrix layer; and the touch sensing structural layer is located between the upper substrate and the black matrix layer or is located between the black matrix layer and the colored resin layer or is located on the colored resin layer.

8. The display device of claim 6, wherein the first touch sensing electrode is composed of a plurality of first touch sensing sub-electrodes independent of each other where the first touch sensing sub-electrodes are arrange by spacing apart from the second touch sensing electrodes; and the first touch sensing sub-electrodes belonging to a same first touch sensing electrode and located on two sides of the second touch sensing electrode are electrically connected through a first bridging connection line; or the second touch sensing electrode is composed of a plurality of second touch sensing sub-electrodes independent of each other where the second touch sensing sub-electrodes are arrange by spacing apart from the first touch sensing electrodes; and the second touch sensing sub-electrodes belonging to a same second touch sensing electrode and located on two sides of the first touch sensing electrode are electrically connected through a second bridging connection line.

9. The display device of claim 8, wherein the projection on the lower substrate, of the first and second bridging connection lines is located in the region where the projection on the lower substrate, of the pattern of the black matrix layer is located.

10. The display device of claim 6, wherein the material of the first touch sensing electrode and second touch sensing electrode is a metal material or a transparent conductive oxide material.

* * * * *